United States Patent
Lee et al.

(10) Patent No.: US 11,349,982 B2
(45) Date of Patent: May 31, 2022

(54) ELECTRONIC COMMUNICATION SYSTEM AND METHOD WITH SENTIMENT ANALYSIS

(71) Applicant: Mitel Networks Corporation, Kanata (CA)

(72) Inventors: Kevin Lee, Kanata (CA); Jonathan Braganza, Ottawa (CA); Justin Ghantous, Ottawa (CA); Logendra Naidoo, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 16/859,674

(22) Filed: Apr. 27, 2020

(65) Prior Publication Data

US 2021/0337065 A1 Oct. 28, 2021

(51) Int. Cl.
| | |
|---|---|
| G06F 40/169 | (2020.01) |
| H04M 3/22 | (2006.01) |
| G06F 40/53 | (2020.01) |
| G10L 25/63 | (2013.01) |
| H04M 3/42 | (2006.01) |

(52) U.S. Cl.
CPC ........ H04M 3/2218 (2013.01); G06F 40/169 (2020.01); G06F 40/53 (2020.01); G10L 25/63 (2013.01); H04M 3/42221 (2013.01)

(58) Field of Classification Search
None
See application file for complete search history.

(56) References Cited

U.S. PATENT DOCUMENTS

| | | | |
|---|---|---|---|
| 10,187,690 B1 | 1/2019 | Garcia et al. | |
| 10,573,312 B1 | 2/2020 | Thomson et al. | |
| 2015/0195406 A1* | 7/2015 | Dwyer | G10L 15/26 379/265.07 |
| 2017/0109651 A1* | 4/2017 | Bruno | G06F 40/30 |
| 2021/0158235 A1* | 5/2021 | Sivasubramanian | ... G06F 40/30 |
| 2021/0160581 A1* | 5/2021 | Difrancesco | ..... H04N 21/44008 |
| 2021/0201897 A1* | 7/2021 | Mital | ...................... G10L 25/63 |

OTHER PUBLICATIONS

"New CallMiner AI-Enabled Emotion Solution Reveals Unique Sentiment . . . ", www.globenewswire.com/news-release, Nov. 5, 2019.

* cited by examiner

Primary Examiner — Nafiz E Hoque

(57) ABSTRACT

Electronic communication methods and systems for determining sentiment associated with a communication, conveniently displaying indicia of the sentiment information, and scoring the sentiment information are disclosed. The methods and systems can include associating an emoji with a sentiment and annotating information, for example, a highlight reel or a waveform, with the emoji.

18 Claims, 8 Drawing Sheets

ELECTRONIC COMMUNICATION SYSTEM AND METHOD WITH SENTIMENT ANALYSIS

FIELD OF THE INVENTION

The present disclosure generally relates to electronic communication methods and systems. More particularly, examples of the disclosure relate to electronic communication methods and systems suitable for determining sentiments associated with a communication and displaying indications thereof.

BACKGROUND OF THE DISCLOSURE

Call or contact centers can be used for a variety of applications, including taking orders, providing technical support, taking surveys, receiving complaints, and the like. Call center agents can communicate with others, such as customers, using a variety of communication techniques, including voice calls, video calls, chats, texts, emails, or other electronic communication techniques.

During a call center communication, a sentiment of the customer and/or of the agent may vary during the course of the communication. Additionally or alternatively, sentiments or average sentiments of agents, groups of agents, and/or customers can vary. Unfortunately, it can be difficult to detect and/or determine sentiment trends for particular agents, groups of agents, or for particular customers. Further, it can be difficult to determine how particular agents handle communications for certain sentiments, such as negative or aggressive sentiments. Accordingly, improved electronic communication systems and methods that allow for relatively easy review and analysis of customer and/or agent sentiments are desired.

Any discussion of problems provided in this section has been included in this disclosure solely for the purposes of providing a background for the present invention and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of exemplary embodiments of the present disclosure provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems and methods. The electronic communication systems and methods can be used in a variety of applications, including use in call centers. Exemplary methods and systems can determine one or more sentiments associated with an electronic communication (e.g., various sections or portions of the electronic communication) and display indicia of the sentiment(s) and communication information to a user, such as a call center agent or an agent supervisor. The indicia can be in the form of one or more emojis, which allows for universal (e.g., language-independent) review of sentiments associated with a communication. The emojis can be presented in the form of a highlight reel, which allows easy review of sentiments and easy access to underlying (e.g., audio and/or transcribed) information associated with the communication. Further, methods are provided for displaying information annotated with emojis. The emojis can be linked to information, such as audio and/or transcribed information associated with a communication.

Figure 1:
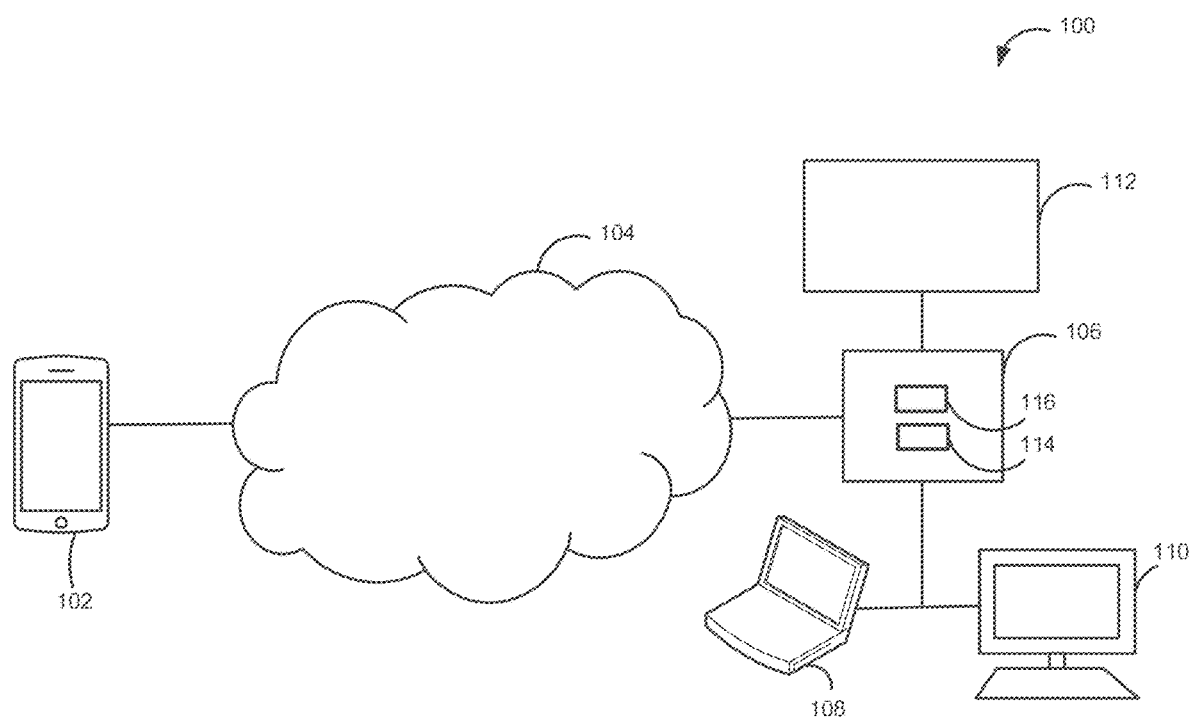
FIG. 1 illustrates an electronic communication system in accordance with exemplary embodiments of the disclosure.

Turning now to the figures, FIG. 1 illustrates an electronic communication system 100 in accordance with exemplary embodiments of the disclosure. For illustration purposes, system 100 is described in the context of a call center. However, unless otherwise noted, systems and methods in accordance with embodiments of the disclosure are not so limited.

Electronic communication system 100 includes one or more devices, such as devices 102, 108, and 110; a network 104; a communication server 106; and a sentiment determination system 112 coupled to communication server 106. Electronic communication system 100 can include other devices, servers, networks, and the like, coupled to communication server 106 and/or network 104.

Devices 102, 108, and 110 can be or include any suitable device with wired or wireless communication features and that can connect to network 104 and/or communication server 106. For example, one or more of devices 102, 108, 110 can be or include a wearable device, a tablet computer, a wired phone, a mobile phone, a personal (e.g., laptop or desktop) computer, a streaming device, such as a game console or other media streaming device, or the like. One or more of devices 102, 108, 110 can include an application or client as to perform various functions set forth herein and/or to cause to be displayed text and/or other information as described herein. By way of example, an application or client can display information, annotated with one or more emojis, to a user in a manner as described in more detail below.

Network 104 can include or be, for example, an internet protocol (IP) network. Exemplary types of networks suitable for communication with network 104 can be or include a local area network, a wide-area network, a metropolitan area network, one or more wireless networks, or a portion of the Internet. Various components of network 104 can be coupled to one or more other components using an Ethernet connection, other wired connections, and/or wireless interfaces. Network 104 can be coupled to other networks and/or to other devices typically coupled to networks. By way of particular example, network 104 includes a communication network and network 104 can be coupled to additional networks that can be coupled to one or more devices, such as device 102. Exemplary additional networks can include a network similar to network 104, a public switched telephone network (PSTN), or the like.

Communication server 106 can be or include any suitable server. Communication server 106 can perform various functions as described herein. For example, communication server 106 can provide electronic communication (e.g., audio, video, text, and/or email) links between device 102 and one or more devices 108, 110. In accordance with an example of the disclosure, communication server 106 includes a private branch exchange (PBX) server. Further, communication server 106 is communicatively coupled to sentiment determination system 112 to receive information from sentiment determination system 112 and include at least some of the information provided by communication server 106 to one or more devices 108, 110.

In some cases, communication server 106 can include a switch+IVR module 114 and optionally a user authentication module 116. Although separately illustrated, switch+IVR module 114 and user authentication module 116 can be combined and/or various functions of one or more of switch+(optional) interactive voice response (IVR) module 114 and user authentication module 116 can be separated into one or more additional modules and/or servers. In some cases, authentication module 116 can be used to authenticate an agent or a supervisor. Such authentication can be used to allow access to various information and/or system functions as described herein.

As used herein, "module" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

Switch+IVR module 114 can be used to control call flows to and from communication server 106. When used, an IVR component of module 114 can be used to allow callers to initially interact with communication server 106 via their telephone keypads and/or voice commands.

Figure 2:
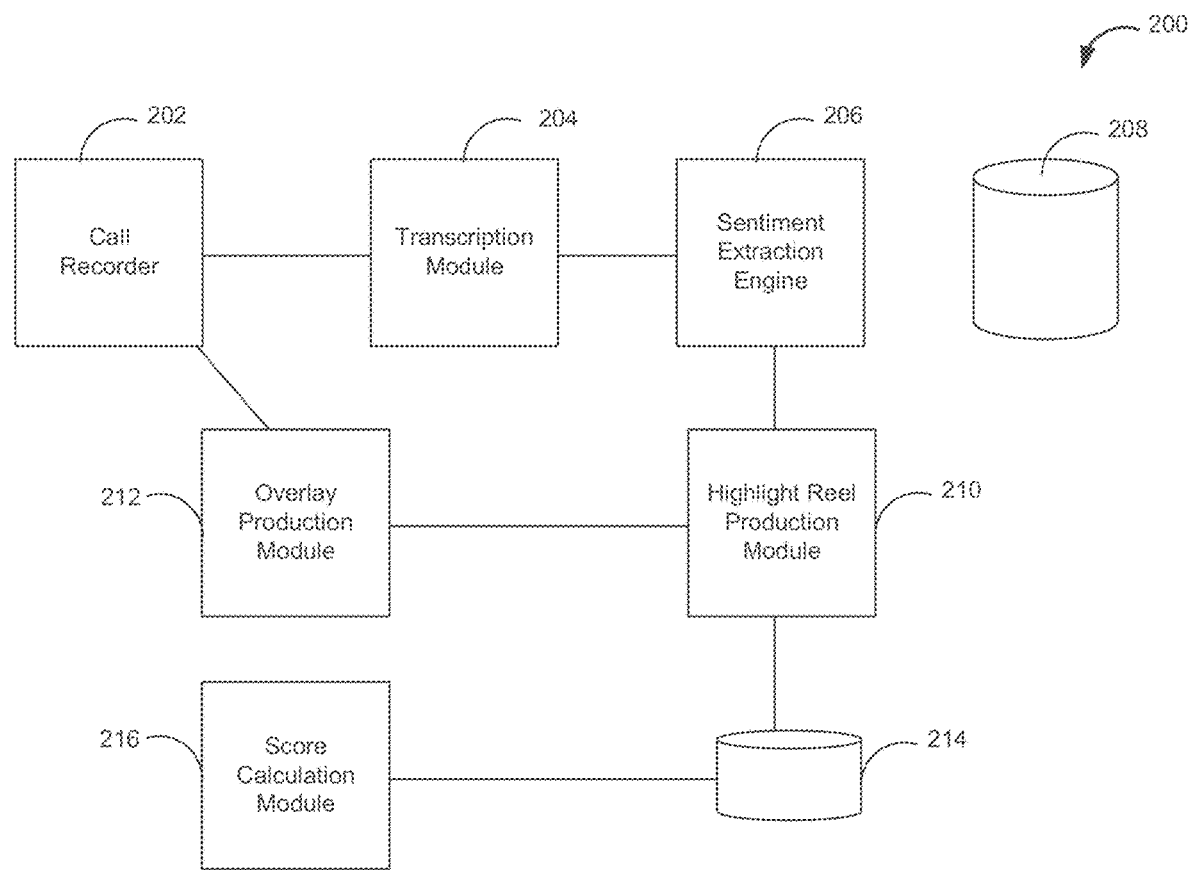
FIG. 2 illustrates a portion of an electronic communication system in accordance with exemplary embodiments of the disclosure in greater detail.

FIG. 2 illustrates a sentiment determination system 200 in accordance with examples of the disclosure. Sentiment determination system 200 can be the same or similar to sentiment determination system 112.

In the illustrated example, sentiment determination system 200 includes a call recorder 202, a transcription module 204, a sentiment extraction engine 206, a database 208, a highlight production module 210, an overlay production module 212, a database 214, and a score (emoji score) calculation module 216. Sentiment determination systems in accordance with other examples of the disclosure can include various combinations of the components of sentiment determination system 200; such sentiment determination system 200 need not include all such components. For example, a sentiment determination system may not include an overlay production module and/or a highlight reel production module.

Call recorder 202 can be or include any suitable module for recording at least a portion of a communication between two devices, such as device 102 and one or more of devices 108, 110 to create audio information associated with a communication. In accordance with examples of the disclosure, call recorder 202 can be automatically initiated once a communication between two or more devices begins or once an agent device (e.g., one or more of devices 108, 110) is connected to a communication. In this case, sentiment determination system 200 can receive a signal from communication server 106 to indicate that a communication has been established and to start recording. Similarly, sentiment determination system 200 can receive a signal from communication server 106 to indicate that a communication has terminated and to stop recording.

Transcription module 204 can transcribe at least a portion of the audio information created by call recorder 202 to generate transcribed information. The transcription can be substantially real-time, such that the transcribed information is at least partially generated during a communication. Alternatively, the transcribed information can be generated at a later time, such as after the communication has ended, on demand (e.g., when a report is requested), or the like.

Sentiment extraction engine 206 can analyze the transcribed information and/or the audio information to determine sentiment information. For example, sentiment extraction engine 206 can review audio and/or transcribed information and determine sentiment based on matching predefined words or phrases with words or terms stored in a database, such as database 208 or another database. The matching need not be with identical terms. The match can be to synonyms stored within the database. Additionally or alternatively, a loudness or a changes in loudness (e.g., 10 decibels or more or 15 decibels or more) can be used to determine a sentiment, such as anger or frustration. In some cases, sentiment can perform machine learning and update words, phrases, and/or emojis associated with the words and phrases based on the learning.

Databases 208 and/or 214 can include one or more devices, such as computers or servers, to store information. By way of examples, databases 208, 214 can use one or more of Microsoft SQL Server, MySQL, Microsoft Access, Oracle, or the like relational database systems. Further, although separately illustrated, databases 208 and 214 can be combined and/or combined with other databases.

In accordance with examples of the disclosure, database 208 includes a list of sentiment terms and one or more emojis associated with the sentiment terms. For example, a negative or angry emoji ☹ can be associated with terms, such as "not acceptable," I want to "speak with a manager," "refund" or the like; a positive or happy emoji ☺ can be associated with terms, such as "like," "thank you," and the like. Additionally or alternatively, emojis can be associated with an agent's dialog. For example, a positive—e.g., high score emoji (e.g., a gold script symbol) can be associated with a dialog that follows a predetermined script and/or a negative emoji (e.g., a black script) can be associated with dialog that does not follow a script. The terms associated with emojis can be in one or more languages. The table can include icons/emojis and/or associated words retrieved from other sources, such as the Unicode Consortium. Additionally or alternatively, the database can be generated by an enterprise. In these cases, the database can include custom or unique emojis associated with words. Further, in some cases, an agent can add an emoji to a conversation (e.g., chat) with a customer. Such emoji's can be added to the database with associated words—e.g., 1-2 words preceding and/or 1-2 words following the emoji. Table 1 below illustrates exemplary emojis and exemplary terms associated with the emojis. These examples are meant to be illustrative, and, unless otherwise noted, are not meant to limit the scope of the invention. In addition, each emoji can have an associated score, which can be used to analyze sentiment information. The sentiment terms, emojis, and/or score information can be relationally stored in database 208.

TABLE 1

| Term | Emoji | Score [−10 to 10] |
|---|---|---|
| Angry | ☹ | −10 |
| Frustrated | ☹ | −6 |
| Annoyed | ☹ | −3 |
| Neutral | 😐 | 0 |
| Happy | ☺ | 3 |
| Elated | ☺ | 6 |
| Overjoyed | ☺ | 10 |

Highlight reel production module can access information from sentiment extraction engine and/or database 208 (e.g., emojis, audio information, and/or transcribed information) to form a highlight reel that includes one or more emojis associated with an electronic communication.

Figure 6:
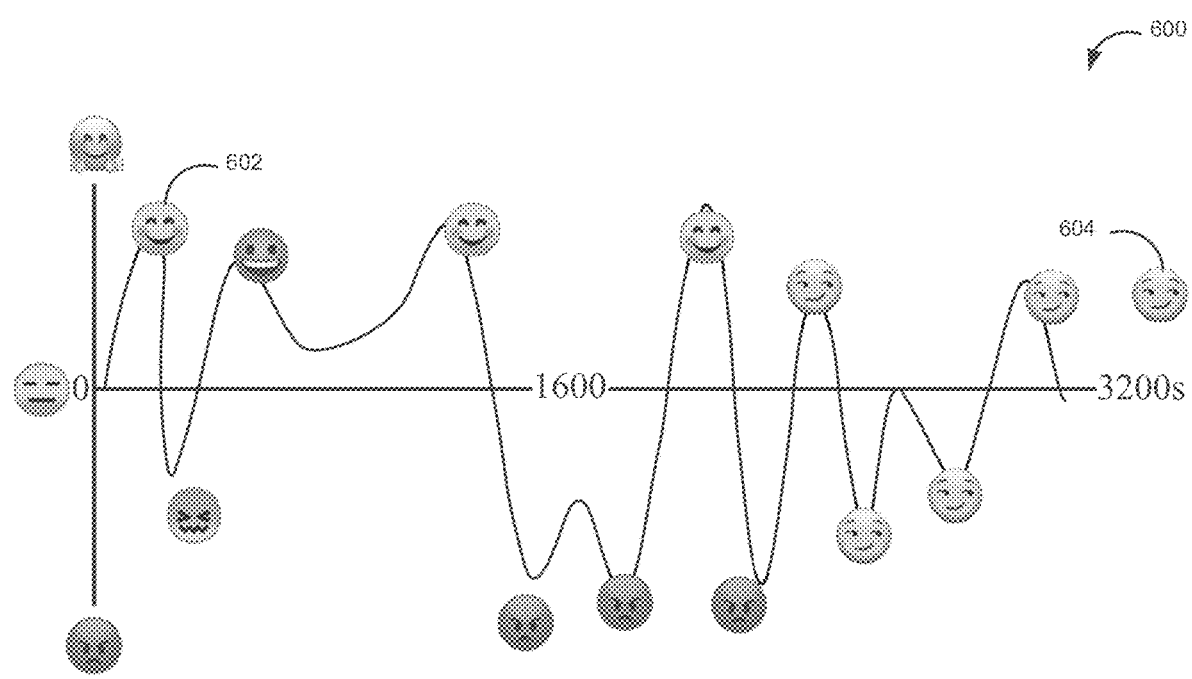
FIG. 6 illustrates a running sentiment graph in accordance with further exemplary embodiments of the disclosure.

An exemplary highlight reel 600 is illustrated in FIG. 6. Highlight reel 600 illustrates sentiment vs. time for an electronic communication. In the illustrated example, the vertical axis relates to sentiment and the horizontal line corresponds to time. One or more emojis (e.g., emoji 602) in highlight reel 600 can be linked to audio information and/or transcribed information, which can be stored in database 208. An emoji 604 corresponding to an average sentiment for a communication, can also be included in the highlight reel. Emoji 604 can be determined by averaging (e.g., a weighted average) scores of the emojis within highlight reel 600. The averaging can be determined using a score, such as the scores illustrated in Table 1. Highlight reel information can be stored in database 208 or database 214.

Figure 7:
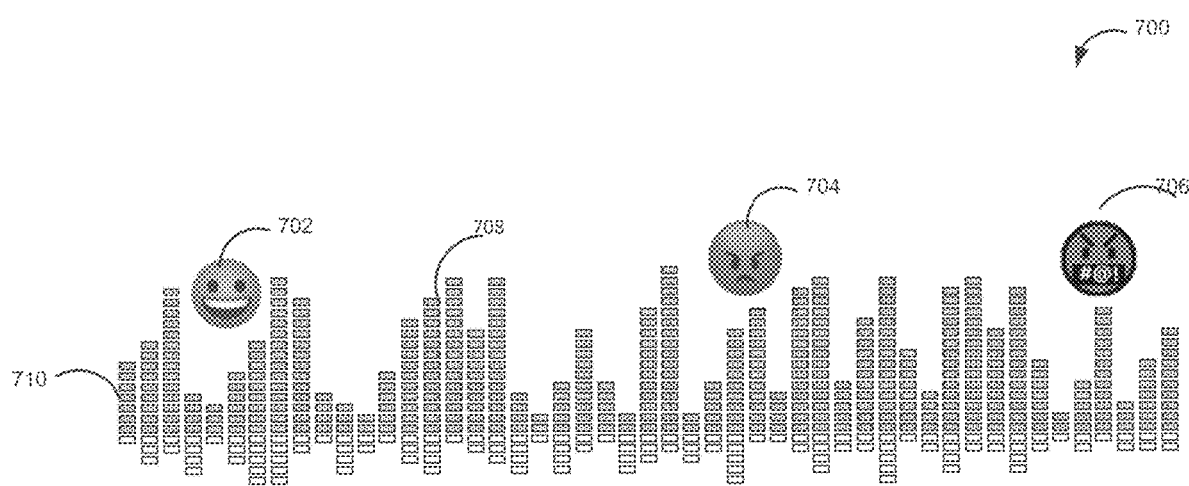
FIG. 7 illustrates an annotated waveform with one or more emojis indicative of sentiment in accordance with further exemplary embodiments of the disclosure.

Overlay production module can be used to provide a waveform 700 of the communication with one or more emojis 702-706 corresponding to sentiment overlaid on a waveform 708 to form annotated waveform 700, as illustrated in FIG. 7. A user—e.g., an agent or a supervisor—can select an emoji 702-706 to hear audio information corresponding to the sentiment associated with the selected emoji. Annotated waveform may be desirable, because it includes an indication of loudness (e.g., length of a segment 710 in a vertical direction). Further, clients or applications on devices 108, 110 can be used to review audio information on any section annotated waveform 700 by, for example, scrolling a cursor over the waveform.

As noted above, database 208 and/or 214 can include sentiment information associated with one or more communications. The sentiment information can further be associated with one or more users (e.g., a user of device 102), one or more agents, and/or one or more supervisors.

Figure 8:
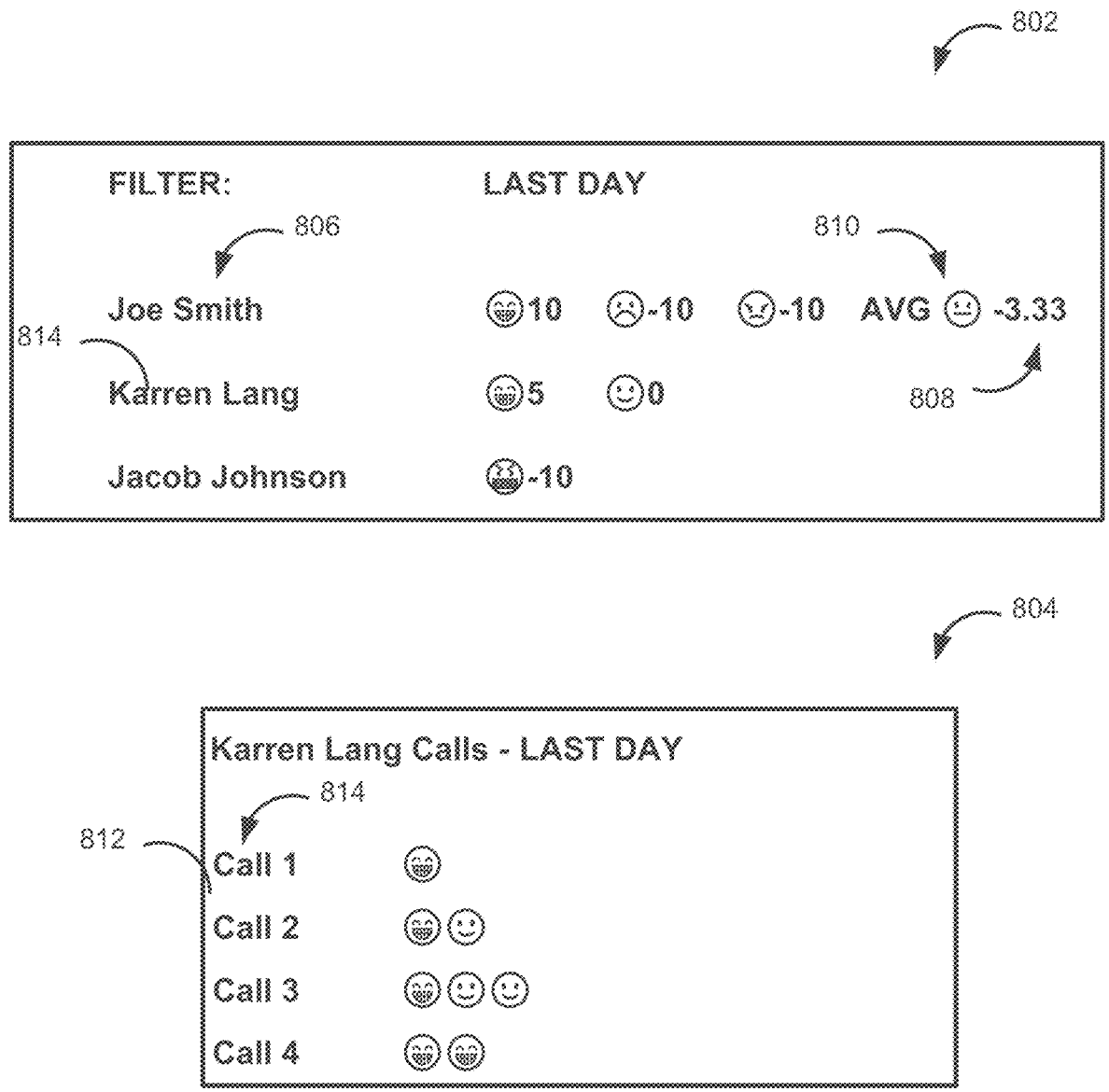
FIG. 8 illustrates examples of displayed information in accordance with further exemplary embodiments of the disclosure.

Score calculation module 216 can be used to determine scores, including average, mean, high, low, and the like scores associated with one or more of a user, agent, or supervisor; such information can be presented to an agent and/or supervisor using a client or application as described herein. FIG. 8 illustrates information 802 that includes summary information for multiple agents that can be presented to a supervisor using the application or client and information 804 for a particular agent that can be displayed to a supervisor using the application or client. Information 802 and/or 804 can be accessed (e.g., on demand) using an application or agent on device 108 or 110.

Information that can be displayed using a system or method described here can vary according to a number of factors. In some cases, each call can represent an information set for the agent, and the more calls an agent handles, the more information sets become available to a supervisor for that agent. The supervisor can then use the information sets to, for example, view trends based on an agent's sentiments or customers' sentiments when communicating with a particular agent or agents. Such information can be used for performance reviews, situational coaching (e.g., "for every moment you lost your cool, we can discuss them quickly and review the events leading up to it;" "I see you're dealing with a lot of irate customers, which is why you may have greater unresolved cases," etc.).

Other trends, such as the agent's best days for performance or best times for performance, can also be observed. Overall trends for the entire contact center can also be made from viewing information associated with multiple agents. This allows observation of the overall effectiveness of a contact center, which can be viewed, for example, by specific hours, days, months or even years. Additional data can be used to add a precursory state which can affect the agent or customer's overall sentiment score. The weight of this against their score could be fully customizable and scored using score calculation module 216. For example, data could be retrieved from social media based off recent status updates or posts.

As illustrated, information 802 can be displayed for a selected time period, which can be selected using the application or client. Further, an average score 808 and optionally an emoji 810 corresponding to the average score for the selected time period can be displayed for each agent. The client or application can allow an agent or supervisor to select an agent 814 from a list of agents 806 to view additional information 804 associated with the selected agent. Additionally or alternatively, the client or application can allow an agent or supervisor to select an emoji. In this case, information for all agents or for selected agents that include the selected emoji can be displayed to the agent or supervisor.

Information 804 can include sentiment information for all communications for the selected time frame for a selected agent (e.g., an agent 814 selected from information 802). Information 804 can include emojis associated with sentiment(s) for each call. The application or client can allow an agent or supervisor to select an emoji to hear audio information and/or view transcribed information associated with the selected sentiment. Selecting the call identification 812 from a list of call identifications can cause an annotated waveform, such as an annotated waveform illustrated in FIG. 7 and/or a highlight reel, such as a highlight reel 600 illustrated in FIG. 6 to be displayed.

Figure 3:
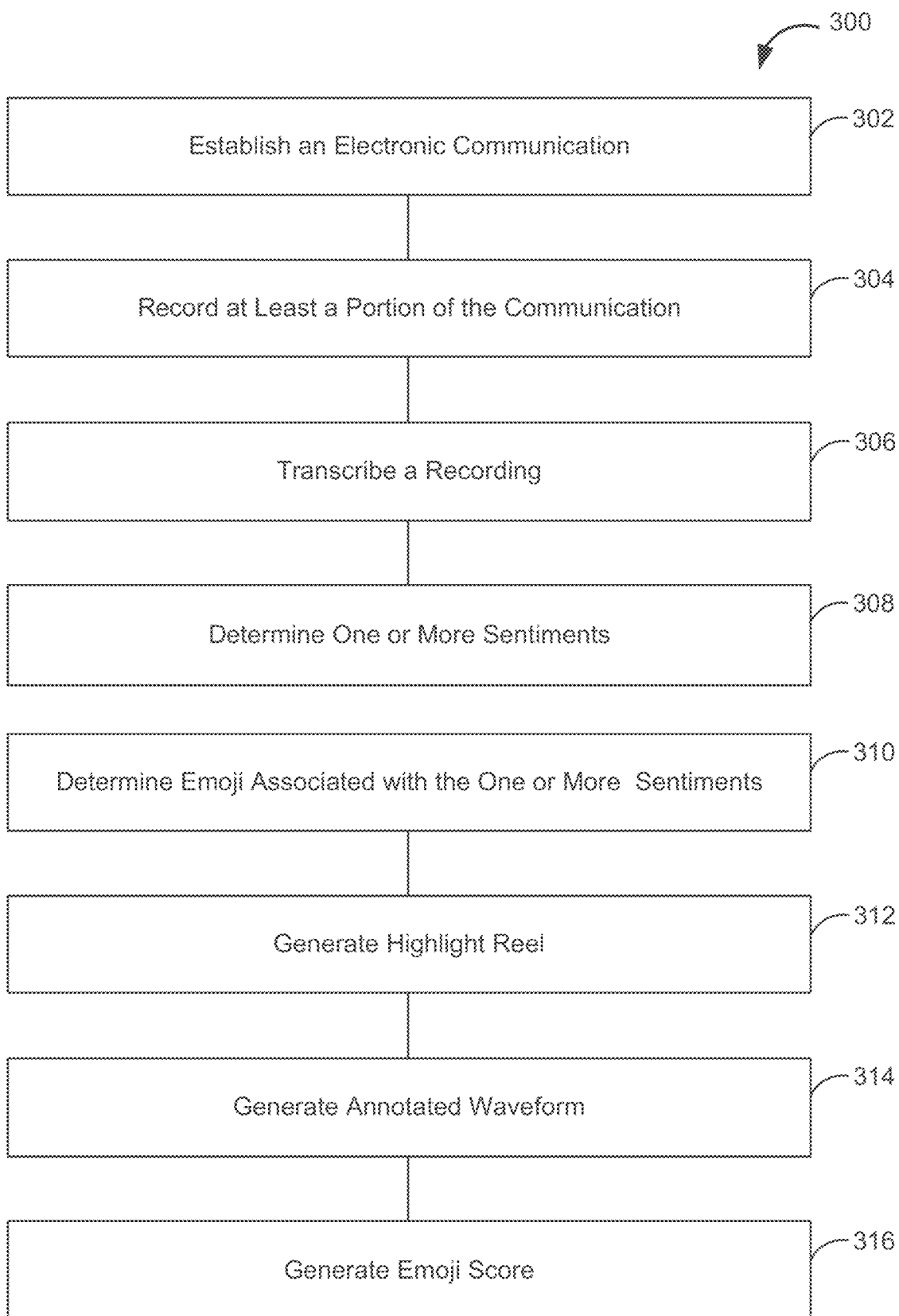
FIG. 3 illustrates a method in accordance with exemplary embodiments of the disclosure.
Figure 4:
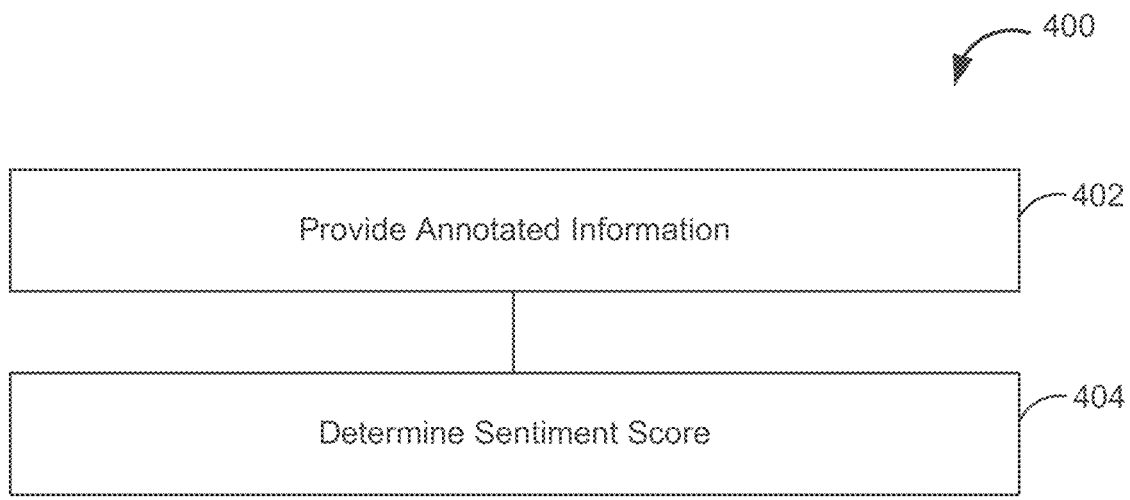
FIG. 4 illustrates another method in accordance with exemplary embodiments of the disclosure.
Figure 5:
FIG. 5 illustrates another method in accordance with further exemplary embodiments of the disclosure.

Turning now to FIGS. 3-5, exemplary methods in accordance with embodiments of the disclosure are illustrated. The illustrative methods can be performed using, for example, system 100 and/or sentiment determination system 200.

Method 300, illustrated in FIG. 3, includes the step of establishing an electronic communication (step 302), recording at least a portion of the communication (step 304), transcribing at least a portion of a recording of the communication (step 306), determining one or more sentiments (step 308), determining an emoji associated with the one or more sentiments (step 310), generating a highlight reel (step 312), generating an annotated waveform (step 314), and generating an emoji score (step 316). Methods in accordance with various examples of the disclosure need not include all of the illustrated steps and may include various combinations of the illustrated steps.

During step 302, a communication is established between a user device (e.g., device 102) and an agent device (e.g., device 108 or 110). The communication can include, for example, an internet protocol (IP) communication.

Once a communication is established, at least a portion of the communication is recorded during step 302. The at least a portion of the communication can be recorded using, for example, call recorder 202. The recording can be stored as audio information in a database, such as database 208.

During step 306, at least a portion of the audio information is transcribed to generate transcribed information. The transcribed information can be stored in a database, such as database 208. As noted above, the transcription can be in near real-time (e.g., begin during the communication) or can be performed after the communication has ended.

Once the transcription has started or after the transcription is completed, one or more sentiments associated with the communication are determined during step 308. As noted above, the sentiment(s) can be determined using sentiment extraction engine 206.

During step 310, an emoji associated corresponding to the sentiment determined from step 308 is determined. The emoji can be determined by querying a database including sentiment and associated emoji information, such as database 208.

During step 312, a highlight reel, such as highlight reel 600, is generated. The highlight reel can be interactive, such that a user (e.g., agent or supervisor) can select a portion of the reel and listen to corresponding audio information and/or view corresponding transcribed information.

Additionally or alternatively, during step 314, an annotated waveform, such as annotated waveform 700, is generated. The annotated waveform can be generated using overlay production module 212 and can be stored in a database, such as database 208 or 214.

During step 316, an average score for a communication, for a customer, for an agent, for a group of agents, or the like can be calculated—e.g., using score calculation module 216. Individual score information associated with a customer, agent, group, or the like can be stored in database 214. The scores can be calculated in real time or on demand, such as upon request and selection by a supervisor.

FIG. 4 illustrates method 400 of determining a score or scores associated with, for example, one or more agents. Method 400 includes the step of providing annotated information (step 402) and determining a sentiment score (step 404).

During step 402, annotated information from one or more prior communications is accessed. A score, such as an average or mean score can be calculated based on the annotated information—e.g., using score calculation module 216. Agent scores can be displayed, for example, as illustrated in FIG. 8. A prior customer score can be accessed during a call set up and can be used to determine to which agent a call should be connected. For example, a previously disgruntled or angry customer can be routed to a senior agent. Method 400 can, for example, allow a supervisor to review summaries of communications for particular agents for, for example, selectable time periods, selectable topics, or the like.

FIG. 5 illustrates another method 500 in accordance with embodiments of the disclosure. Method 500 includes the steps of providing annotated information (step 502), determining a prior sentiment score (step 504), determining a current sentiment score (step 506), and determining a comparison or weighted score (step 508).

During step 502, annotated information from a previous communication that is stored in a database can be retrieved. The sentiment information can also be retrieved or can be determined during step 504. During step 506, the sentiment of the current communication is determined—e.g., using techniques described herein. A weighted average of the current and one or more prior communications are determined during step 508—e.g., using score calculation module 216. The weighted score can be reviewed by a supervisor to see if an improvement or decline in sentiment occurred. A number of prior communications can be selected by a supervisor or may be filtered to relate to a specific topic.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. For example, although much of the disclosure relates to a call center, the methods and systems can be used for other applications, such as conversion of hardware or software states into emoji-based functions, each with dynamically generated interface elements. For example, a log file that highlights failure conditions or events could be parsed then summarized using a highlight reel. Performance indicators for virtually any device could be more easily summarized using universally accepted emojis as a summary-oriented lexicon to access log events. These and other changes or modifications are intended to be included within the scope of the present invention, as expressed in the following claims.

The invention claimed is:

1. An electronic communication system comprising:
   a communication server;

a sentiment determination system coupled to the communication server;
one or more devices coupled to the communication server;
a highlight reel production module to generate information annotated with one or more emojis indicative of sentiment; and
an overlay production module to generate an acoustic waveform annotated with one or more emojis indicative of sentiment,
wherein the sentiment determination system determines a sentiment during an electronic communication and generates information comprising the one or more emojis corresponding to the sentiment to illustrate sentiment versus time, wherein the one or more emojis are linked to audio and/or transcribed information, and
wherein a user can select an emoji to hear audio information corresponding to the sentiment associated with the selected emoji.

2. The electronic communication system of claim 1, further comprising a call recorder to record the audio information during an electronic communication between the one or more devices and the communication server.

3. The electronic communication system of claim 2, further comprising a transcription module to transcribe the audio information.

4. The electronic communication system of claim 1, wherein the sentiment determination system comprises a sentiment extraction engine.

5. The electronic communication system of claim 1, further comprising a database comprising emoji information and corresponding sentiment information.

6. The electronic communication system of claim 1, wherein the information annotated with one or more emojis indicative of sentiment further comprises an average sentiment emoji corresponding to an average sentiment for the electronic communication.

7. The electronic communication system of claim 1, further comprising a score calculation module.

8. The electronic communication system of claim 7, wherein the score calculation module determines a sentiment score associated with a caller.

9. The electronic communication system of claim 7, wherein the score calculation module determines a sentiment score associated with an agent.

10. An electronic communication method comprising the steps of:
establishing an electronic communication;
transcribing at least a portion of a recording of the communication to generate transcribed information;
determining one or more sentiments associated with the at least a portion of the transcribed information;
generating annotated information comprising one or more emojis associated with each of the one or more sentiments;
generating an acoustic waveform annotated with the one or more emojis indicative of the one or more sentiments; and
selecting an emoji of the one or more emojis to hear audio information associated with a sentiment corresponding to the selected emoji.

11. The electronic communication method of claim 10, further comprising the step of generating an audio recording of at least a portion of the communication.

12. The electronic communication method of claim 10, further comprising the step of generating a highlight reel.

13. The electronic communication method of claim 10, further comprising the step of selecting a section of the audio information by scrolling a cursor over the acoustic waveform.

14. The electronic communication method of claim 10, further comprising the step of generating an emoji score associated with a customer.

15. The electronic communication method of claim 10, further comprising the step of generating an emoji score associated with an agent.

16. The electronic communication method of claim 10, further comprising the step of generating a summary of emoji scores associated with the agent.

17. The electronic communication method of claim 10, further comprising the steps of:
generating an emoji score for the electronic communication; and
comparing the emoji score for the electronic communication to a prior communication emoji score.

18. An electronic communication system comprising:
a communication server;
a sentiment determination system coupled to the communication server; and
one or more devices coupled to the communication server,
wherein the sentiment determination system comprises:
a sentiment extraction engine;
a database comprising emoji information and corresponding sentiment information; and
an overly production module, wherein the overly production module generates a waveform of the communication and a plurality of emojis corresponding to sentiment overlaid on the waveform,
wherein at least one emoji of the plurality of emojis is selectable to hear audio information associated with a sentiment corresponding to the selected emoji.

* * * * *